United States Patent
Na et al.

(10) Patent No.: US 10,929,289 B2
(45) Date of Patent: Feb. 23, 2021

(54) CONTROLLER, MEMORY SYSTEM AND OPERATING METHOD THEREOF

(71) Applicant: SK hynix Inc., Gyeonggi-do (KR)

(72) Inventors: Hyeong Ju Na, Gyeonggi-do (KR); Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/598,776

(22) Filed: Oct. 10, 2019

(65) Prior Publication Data
US 2020/0310967 A1  Oct. 1, 2020

(30) Foreign Application Priority Data
Mar. 27, 2019 (KR) .................. 10-2019-0035088

(51) Int. Cl.
*G06F 12/02* (2006.01)

(52) U.S. Cl.
CPC ...... *G06F 12/0253* (2013.01); *G06F 12/0246* (2013.01); *G06F 2212/1044* (2013.01); *G06F 2212/7205* (2013.01)

(58) Field of Classification Search
CPC ............. G06F 12/0246; G06F 12/0253; G06F 2212/1044; G06F 2212/7205
See application file for complete search history.

(56) References Cited

U.S. PATENT DOCUMENTS

| | | | |
|---|---|---|---|
| 2015/0113206 A1* | 4/2015 | Fitzpatrick | G11C 16/3495 711/103 |
| 2016/0283401 A1* | 9/2016 | Virajamangala | G06F 12/0246 |
| 2017/0242789 A1* | 8/2017 | Ahmed | G06F 12/0246 |
| 2018/0225151 A1* | 8/2018 | Park | G06F 3/0659 |

FOREIGN PATENT DOCUMENTS

| | | |
|---|---|---|
| KR | 10-2018-0009430 | 1/2018 |
| KR | 10-2018-0026876 | 3/2018 |

\* cited by examiner

*Primary Examiner* — Eric T Oberly
(74) *Attorney, Agent, or Firm* — IP & T Group LLP

(57) ABSTRACT

Various embodiments relate to a controller, a memory system and an operating method thereof. In one embodiment, a memory system may include a nonvolatile memory device including a plurality of super blocks each comprising a plurality of memory blocks; and a controller configured to control the nonvolatile memory device, wherein the controller is configured to: determine, based on a number of low performance super blocks among the plurality of super blocks, a dirty status threshold value for determining a dirty status of the nonvolatile memory device; determine whether the nonvolatile memory device is in the dirty status based on a number of free super blocks among the plurality of super blocks and the dirty status threshold value; and perform a garbage collection operation on the plurality of super blocks when it is determined that the nonvolatile memory device is in the dirty status.

19 Claims, 11 Drawing Sheets

FIG.9

CONTROLLER, MEMORY SYSTEM AND OPERATING METHOD THEREOF

CROSS-REFERENCES TO RELATED APPLICATION

The present application claims priority under 35 U.S.C. § 119(a) to Korean application number 10-2019-0035088, filed on Mar. 27, 2019, which is incorporated herein by reference in its entirety as set forth in full.

BACKGROUND

1. Technical Field

Various embodiments generally relate to a semiconductor device, and more particularly, to a controller, a memory system and an operating method thereof.

2. Related Art

Recently, the paradigm for the computing environment has changed to the ubiquitous computing environment in which computer systems can be used anytime and anywhere. Therefore, the use of portable electronic devices such as a mobile phone, digital camera and notebook computer has rapidly increased. Such a portable electronic device generally uses a memory system using a memory device. The memory system is used to store data used in the portable electronic device.

Since the memory system using a memory device has no mechanical driver, the data storage device has excellent stability and durability, exhibits high information access speed, and has low power consumption. Examples of the memory system having such advantages include a universal serial bus (USB) memory device, a memory card having various interfaces, a universal flash storage (UFS) device, and a solid state drive (SSD).

SUMMARY

In one embodiment of the present disclosure, a memory system may include: a nonvolatile memory device including a plurality of super blocks each comprising a plurality of memory blocks; and a controller configured to control the nonvolatile memory device, wherein the controller is configured to: determine, based on a number of low performance super blocks among the plurality of super blocks, a dirty status threshold value for determining a dirty status of the nonvolatile memory device; determine whether the nonvolatile memory device is in the dirty status based on a number of free super blocks among the plurality of super blocks and the dirty status threshold value; and perform a garbage collection operation on the plurality of super blocks when it is determined that the nonvolatile memory device is in the dirty status.

In one embodiment of the present disclosure, an operating method of a memory system comprising a nonvolatile memory device including a plurality of super blocks each comprising a plurality of memory blocks and a controller configured to control the nonvolatile memory device may include: determining, by the controller, based on a number of low performance super blocks among the plurality of super blocks, a dirty status threshold value for determining a dirty status of the nonvolatile memory device; determining, by the controller, whether the nonvolatile memory device is in the dirty status based on a number of free super blocks among the plurality of super blocks and the dirty status threshold value; and performing, by the controller, a garbage collection operation on the plurality of super blocks when it is determined that the nonvolatile memory device is in the dirty status.

In one embodiment of the present disclosure, a memory system may include: a nonvolatile memory device including a plurality of free super blocks including low performance super blocks and normal blocks; and a controller coupled to the nonvolatile memory device, suitable for: determining whether a number of free super blocks is less than a threshold value; when it is determined that the number of free super blocks is less than a threshold value, determining the nonvolatile memory device is in a dirty status; and performing a garbage collection operation on the plurality of super blocks when it is determined that the nonvolatile memory device is in the dirty status, wherein the threshold value is adjusted based on the number of low performance super blocks.

BRIEF DESCRIPTION OF THE DRAWINGS

Features, aspects and embodiments are described in conjunction with the attached drawings, in which.

DETAILED DESCRIPTION

Hereinafter, a semiconductor apparatus according to the present disclosure will be described below with reference to the accompanying drawings through exemplary embodiments.

Figure 1:
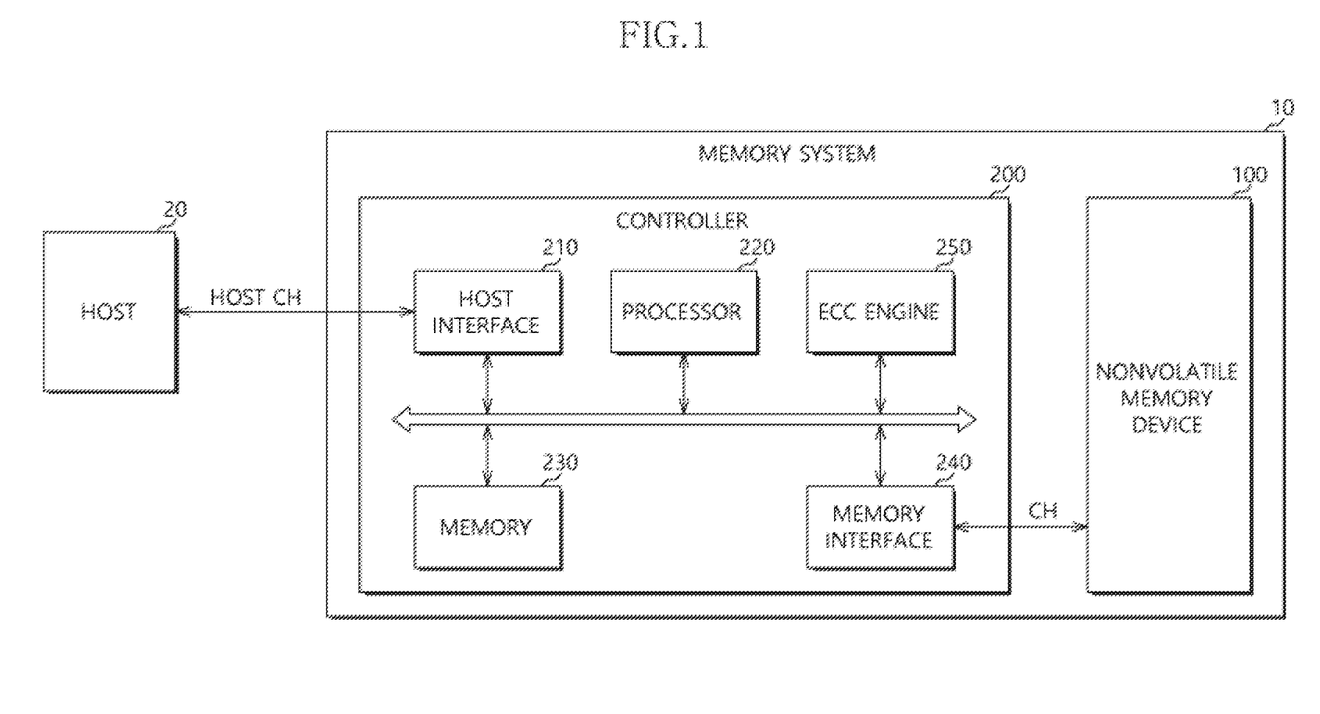
FIG. 1 is a diagram illustrating a memory system in accordance with an embodiment of the present disclosure.

FIG. 1 is a diagram illustrating a memory system 10 in accordance with an embodiment of the present disclosure. Referring to FIG. 1, the memory system 10 may store data to be accessed by a host 20 such as a mobile phone, an MP3 player, a laptop computer, a desktop computer, a game player, a television (TV), an in-vehicle infotainment system, and the like.

The memory system 10 may be manufactured as any one among various types of storage devices according to an interface protocol coupled to the host 20. For example, the memory system 10 may be configured of any one of various types of storage devices, such as a solid state drive (SSD), a multimedia card in the forms of MMC, eMMC, RS-MMC and micro-MMC, a secure digital card in the forms of SD, mini-SD and micro-SD, a universal serial bus (USB) storage device, a universal flash storage (UFS) device, a storage device of the type of a personal computer memory card international association (PCMCIA) card, a storage device of the type of a peripheral component interconnection (PCI), a storage device of the type of a PCI-express (PCI-e or PCIe), a compact flash (CF) card, a smart media card, a memory stick, and the like.

The memory system 10 may be manufactured as any one among various types of packages. For example, the memory system 10 may be manufactured as any one of various types of packages, such as a package on package (POP), a system in package (SIP), a system on chip (SOC), a mufti-chip package (MCP), a chip on board (COB), a wafer-level fabricated package (WFP), and a wafer-level stack package (WSP).

The memory system 10 may include a nonvolatile memory device 100 and a controller 200.

The nonvolatile memory device 100 may operate as a storage medium of the memory system 10. According to a memory cell configuring the nonvolatile memory device 100, the nonvolatile memory device 100 may be implemented as one among various nonvolatile memory device such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase-change random access memory (PRAM) using a chalcogenide alloy, a resistive random access memory (ReRAM) using a transition metal compound and so forth.

Although FIG. 1 exemplifies the memory system 10 including a single nonvolatile memory device 100 for clarity, the memory system 10 may include a plurality of nonvolatile memory devices 100 and various embodiments of the present disclosure may be applied to the memory system 10 including the plurality of nonvolatile memory devices 100.

The nonvolatile memory device 100 may include a memory cell array (not shown) including a plurality of memory cells arranged at cross points between a plurality of word lines (not shown) and a plurality of bit lines (not shown). The memory cell array may include a plurality of memory blocks each including a plurality of pages.

For example, each of the memory cells in the memory cell array may be a single level cell (SLC) in which 1-bit data is to be stored and a multi level cell (MLC) in which 2-bit or greater is to be stored. A memory cell in which 2-bit data is to be stored may be referred to as a multi-level cell (MLC), a memory cell in which 3-bit data is to be stored may be referred to as a triple level cell (TLC), and a memory cell in which 4-bit data is to be stored may be referred to as a quadruple level cell (QLC). However, for clarity, the memory cells in which the 2-bit or greater are to be stored may be collectively referred to as the MLC in the description.

In an embodiment, a plurality of data pages may configure a single data page group. For example, when a data page group comprises a plurality of memory cells each configured to store N number of bits, the data page group may include N number of data pages. That is, when a data page group comprises a plurality of MLCs each configured to store 2 bits, the data page group may include a least significant bit (LSB) page and a most significant bit (MSB) page. Also, when a data page group comprises a plurality of TLCs each configured to store 3 bits, the data page group may include a least significant bit (LSB) page, a center significant bit (CSB) page and a most significant bit (MSB) page.

The memory cell array may include at least one of the SLC and the MLC. The memory cell array may include memory cells arranged in a two-dimensional (e.g., horizontal) structure or memory cells arranged in a 3D vertical structure.

The controller 200 may control general operations of the memory system 10 through the driving of firmware or software loaded in the memory 230. The controller 200 may decode and drive instructions or algorithms of a code type such as firmware or software. The controller 200 may be implemented as hardware or combination of hardware and software.

The controller 200 may include a host interface 210, a processor 220, a memory 230, a memory interface 240 and an error correction code (ECC) engine 250.

The host interface 210 may perform interfacing between the host 20 and the memory system 10 according to a protocol of the host 20. For example, the host interface 210 may communicate with the host 20 through any one among a secure digital protocol, a universal serial bus (USB) protocol, a multimedia card (MMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI express (PCI-e or PCIe) protocol and a universal flash storage (UFS) protocol. Also, the host interface 210 may perform a disk emulation operation of supporting the host 20 to recognize the memory system 10 as a general memory system such as a hard disk drive (HDD).

The processor 220 may comprise a micro control unit (MCU) and a central processing unit (CPU). The processor 220 may process requests received from the host 20. To process the requests from the host 20, the processor 220 may drive a code-typed instruction or algorithm (for example, firmware) loaded into the memory 230 and control internal function blocks such as the host interface 210, the memory 230 and the memory interface 240 and the nonvolatile memory device 100.

The processor 220 may generate control signals for controlling operations of the nonvolatile memory device 100 based on the requests from the host 20 and may provide the generated control signals to the nonvolatile memory device 100 through the memory interface 240. Also, the processor 220 may analyze and process a signal SGL provided from the host 20. The processor 220 may control operations of internal function blocks according to firmware or software for driving the memory system 10.

The memory 230 may be configured of a random access memory (RAM) and may be disposed within or outside the controller 200. The memory 230 may store the firmware to be driven by the processor 220. The memory 230 may also store data (for example, meta data) required for driving the firmware. For example, the memory 230 may operate as a working memory of the processor 220. The memory 230 may be configured to include a data buffer configured to temporarily store write data to be transmitted to the nonvolatile memory device 100 from the host 20 or read data to be transmitted to the host 20 from the nonvolatile memory device 100. For example, the memory 230 may operate as a buffer memory of the processor 220.

The memory interface 240 may control the nonvolatile memory device 100 according to control of the processor 220. The memory interface 240 may be referred to as a memory controller. The memory interface 240 may provide control signals to the nonvolatile memory device 100. The control signals may include a command, an address, and an operation control signal for controlling the nonvolatile memory device 100. The memory interface 240 may provide the nonvolatile memory device 100 with data stored in the memory 230 or store data transmitted from the nonvolatile memory device 100 in the memory 230.

The ECC engine 250 may generate a parity by ECC-encoding write data provided from the host 20. The nonvolatile memory device 100 may store therein the write data, to which the parity is added. The ECC engine 250 may read data from the nonvolatile memory device 100, may ECC-decode the read data by using a parity and may generate the read data, from which the parity is removed.

Figure 2:
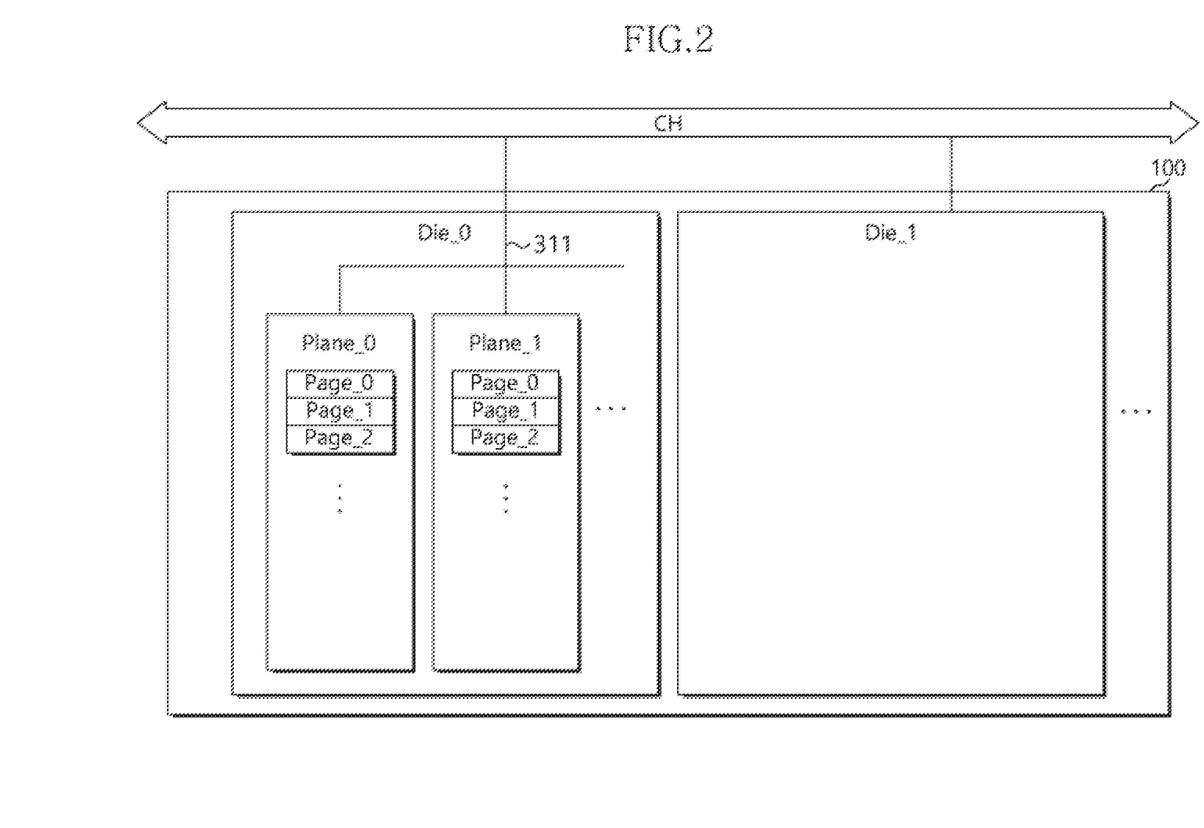
FIG. 2 is a diagram illustrating a data storage region in a nonvolatile memory device in accordance with an embodiment of the present disclosure.

FIG. 2 is a diagram illustrating a data storage region in a nonvolatile memory device in accordance with an embodiment of the present disclosure, for example, the nonvolatile memory device 100 of FIG. 1.

Referring to FIG. 2, the nonvolatile memory device 100 may include a plurality of dies having dies Die_0 and Die_1 sharing a channel CH electrically coupled to the controller 200. Each of the plurality of dies may include a plurality of planes having planes Plane_0 and Plane_1 sharing a way 311 electrically coupled to the channel CH. Each of the plurality of planes may include a plurality of data pages. A data page may be a storage region as a minimum unit from which data is read or into which data is written. A group of a plurality of data pages, on which an erase operation is performed at a time, may be a block. A group of a plurality of blocks managed as a single unit may be a superblock.

According to an embodiment, the controller 200 may be electrically coupled to the nonvolatile memory device 100 through a plurality of channels. Each of the plurality of channels may be electrically coupled to a plurality of dies, as illustrated in FIG. 2.

FIGS. 3A to 3D are diagrams illustrating an operation of a memory system in accordance with an embodiment of the present disclosure.

Figure 3A:
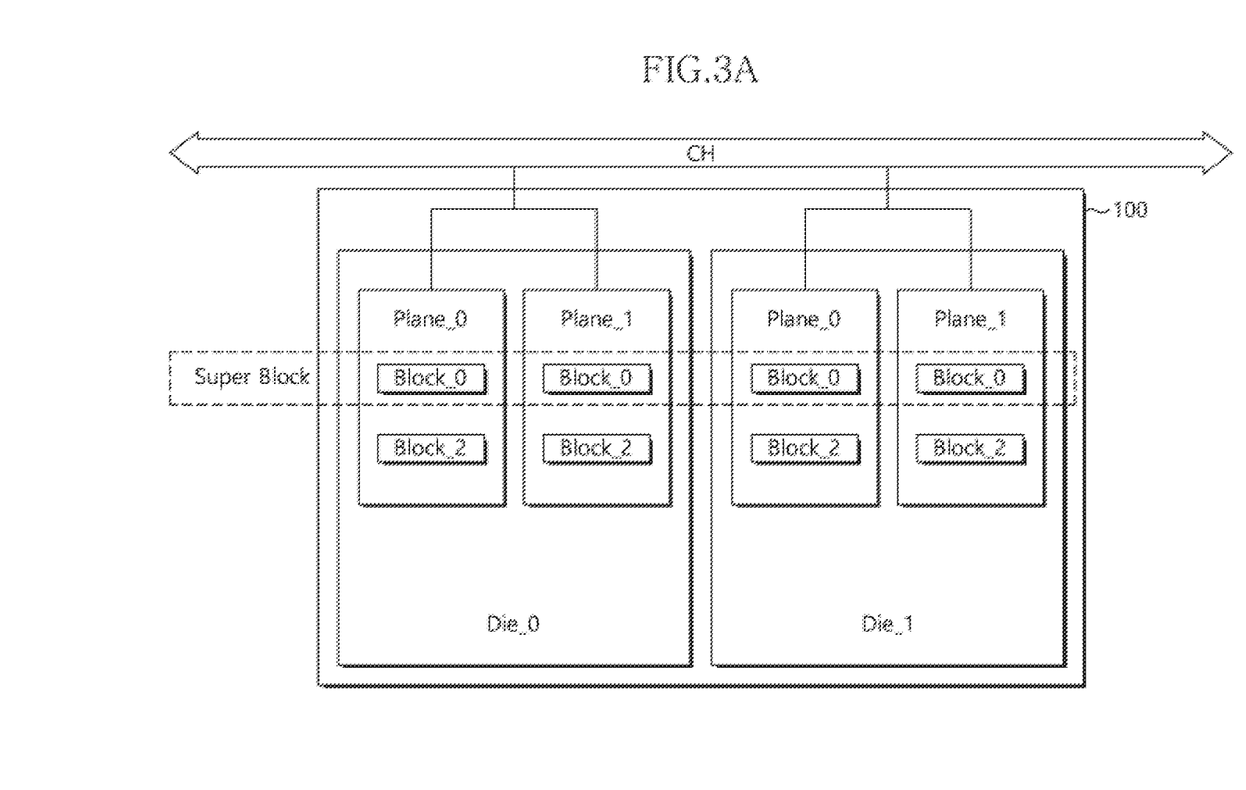
FIGS. 3A to 3D are diagrams illustrating an operation of a memory system in accordance with an embodiment of the present disclosure.

FIG. 3A illustrates an example of the nonvolatile memory device 100, which includes 2 dies Die_0 and Die_1 each comprising 2 planes Plane_0 and Plane_1 each having 2 memory blocks Block_0 and Block_2. Referring to FIG. 3A, first memory blocks Block_0 in the respective planes Plane_0 and Plane_1 of the respective dies Die_0 and Die_1 may be managed as a group of memory blocks configuring a single super block, which is an example of a normal super block that will be described later.

In an embodiment, when the controller 200 is electrically coupled to the nonvolatile memory device 100 through the plurality of channels, a super block may be configured over the dies Die_0 and Die_1 electrically coupled to the plurality of channels. For example, a super block may be configured by first memory blocks Block_0 of the respective planes Plane_0 and Plane_1 of the respective dies Die_0 and Die_1 electrically coupled to the plurality of channels.

Figure 3B:
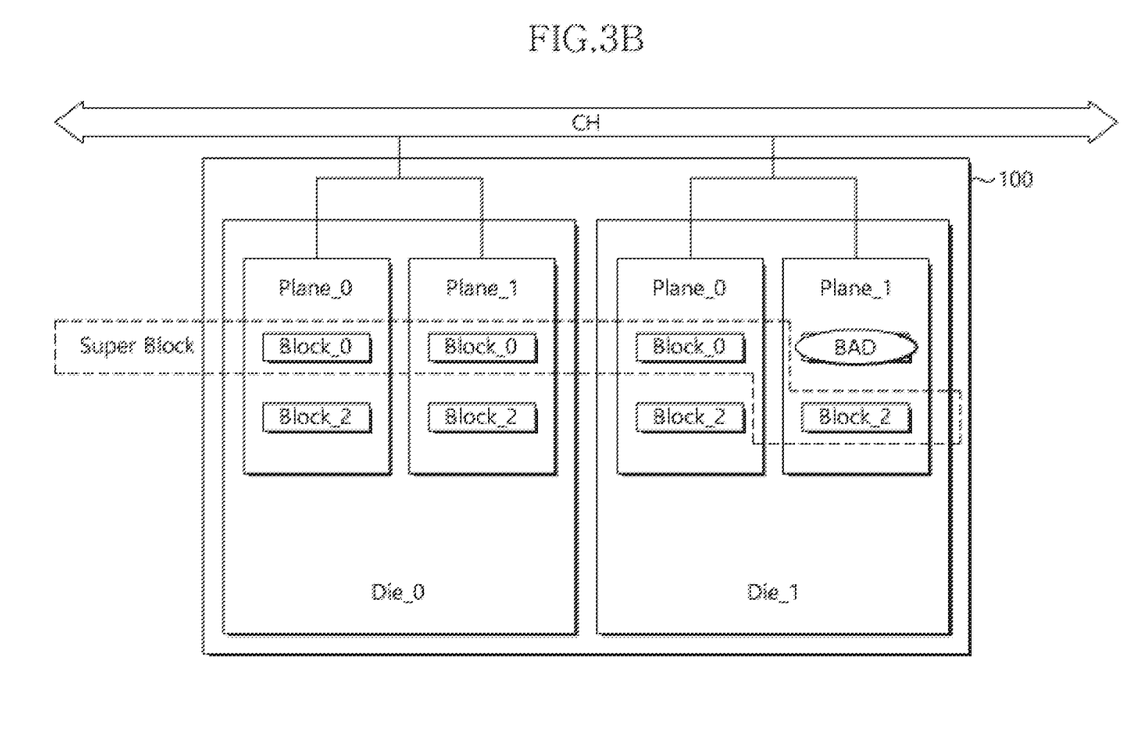

FIG. 3B illustrates an example of a super block when the first memory block Block_0 in the second plane Plane_1 of the second die Die_1 among the memory blocks Block_0 and Block_2 configuring the super block of FIG. 3A becomes a bad block. In the super block, the first memory block Block_0 in the second plane Plane_1 of the second Die_1 among the memory blocks Block_0 and Block_2 configuring the super block of FIG. 3A is replaced with the second memory block Block_2 in the second plane Plane_1 of the second die Die_1. In this case, an interleaving operation may be performed to the super block of FIG. 3B comprising the second memory block Block_2 in the second plane Plane_1 of the second die Die_1 and the first memory blocks Block_0 in other planes of the dies Die_0 and Die_1. Therefore, the super block of FIG. 3B may not have low performance during a write operation and a read operation. Accordingly, the super block of FIG. 3B may be an example of a normal super block that will be described later.

Figure 3C:
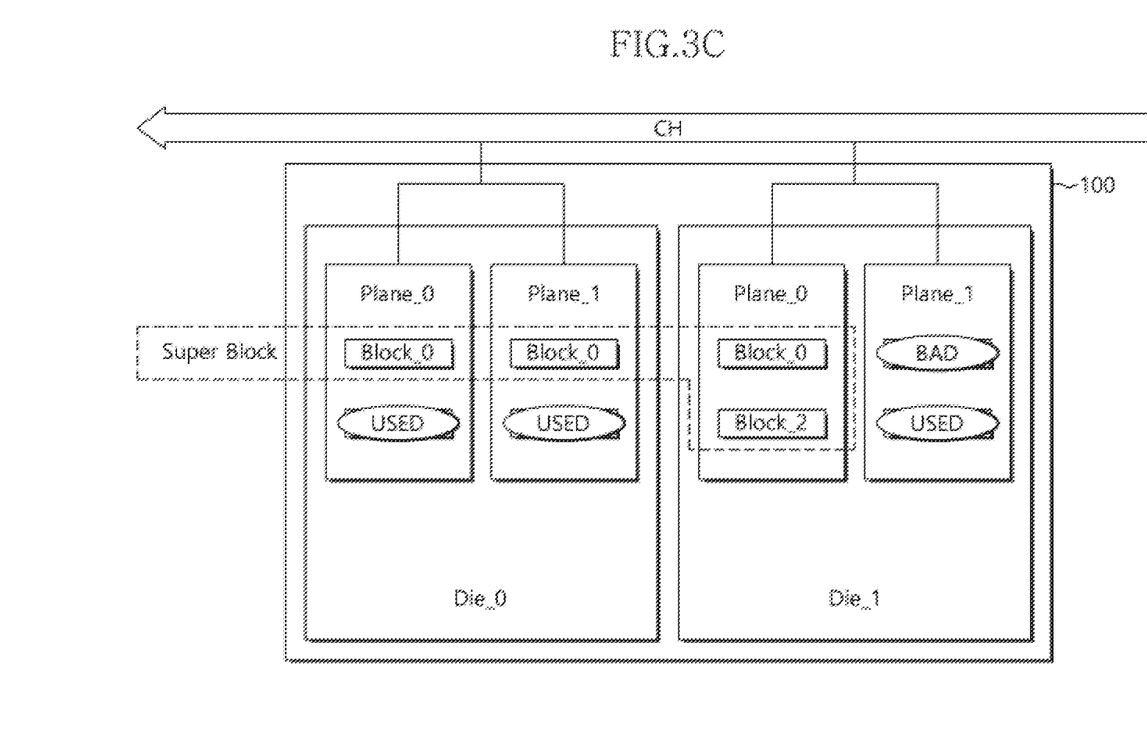

FIG. 3C illustrates an example of a super block when the first memory block Block_0 included in the second plane Plane_1 of the second die Die_1 among the memory blocks Block_0 and Block_2 configuring the super block of FIG. 3A becomes a bad block and only the second memory block Block_2 included in the first plane Plane_0 of the second die Die_1 is available for replacing the bad block. In the super block, the first memory block Block_0 in the second plane Plane_1 of the second die among the memory blocks Block_0 and Block_2 configuring the super block of FIG. 3A is replaced with the second memory block Block_2 in the first plane Plane_0 of the second die Die_1. In this case, because the memory blocks Block_0 and Block_2 in the same plane (i.e., the first plane Plane_0) of the same die (i.e., the second die Die_1), an interleaving operation may not be performed to the memory blocks Block_0 and Block_2 in the first plane Plane_0 of the second die Die_1 within the super block of FIG. 3C is comprising the second memory block Block_2 in the first plane Plane_0 of the second die Die_1 and the first memory blocks Block_0 in other planes of the dies Die_0 and Die_1. Therefore, the super block of FIG. 3C may have low operation speed during a write operation and a read operation. Accordingly, the super block of FIG. 3C may be an example of a low performance super block that will be described later.

Figure 3D:
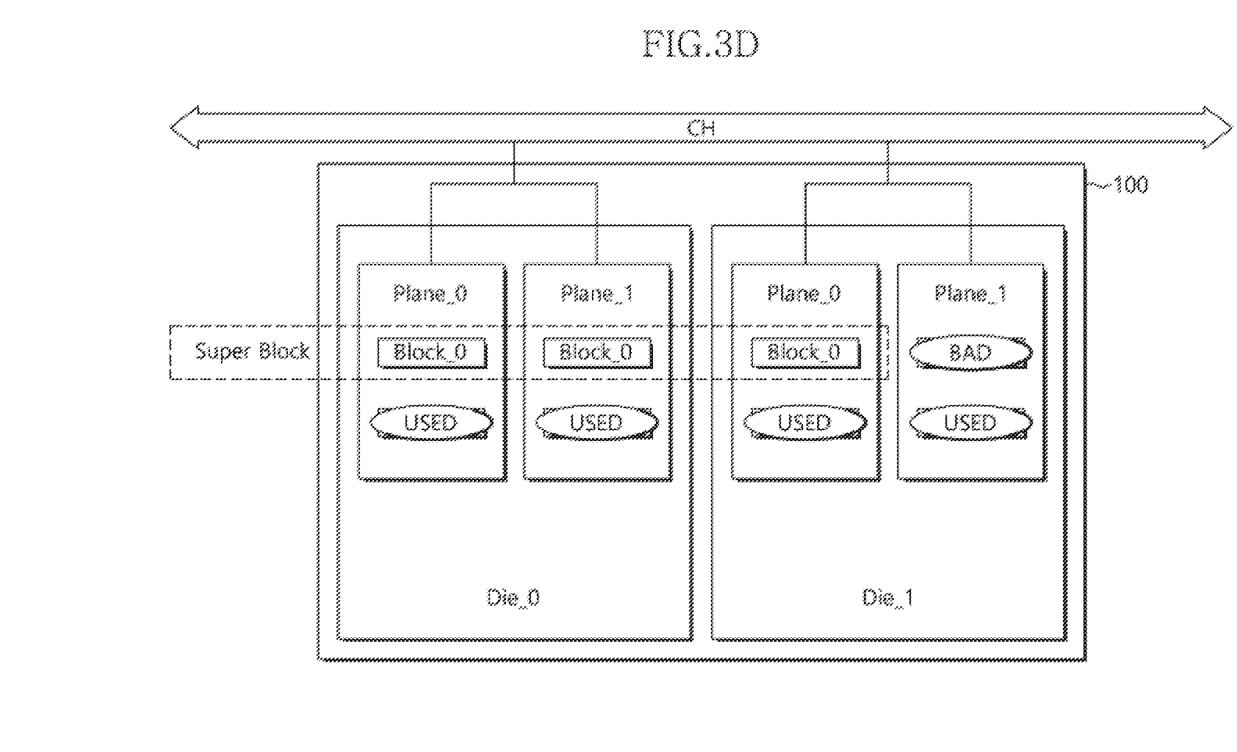

FIG. 3D illustrates an example of a super block when the first memory block Block_0 included in the second plane Plane_1 of the second die Die_1 among the memory blocks Block_0 and Block_2 configuring the super block of FIG. 3A becomes a bad block and there is no available memory block for replacing the bad block. The super block may comprise 3 memory blocks (i.e., the first memory blocks Block_0) except for the first memory block Block_0 in the second plane Plane_1 of the second die Die_1 among the memory blocks Block_0 and Block_2 configuring the super block of FIG. 3A. In this case, because the number of memory blocks configuring the super block of FIG. 3D becomes reduced, a data size to be stored in the super block of FIG. 3D, that is, the storage capacity of the super block of FIG. 3D becomes reduced. Accordingly, the super block of FIG. 3D may be an example of a low performance super block that will be described later.

Hereinafter, description will be made based on that one or more among memory blocks configuring a super block become bad blocks and thus the super block becomes the low performance super block, as illustrated in FIGS. 3C and 3D.

Figure 4:
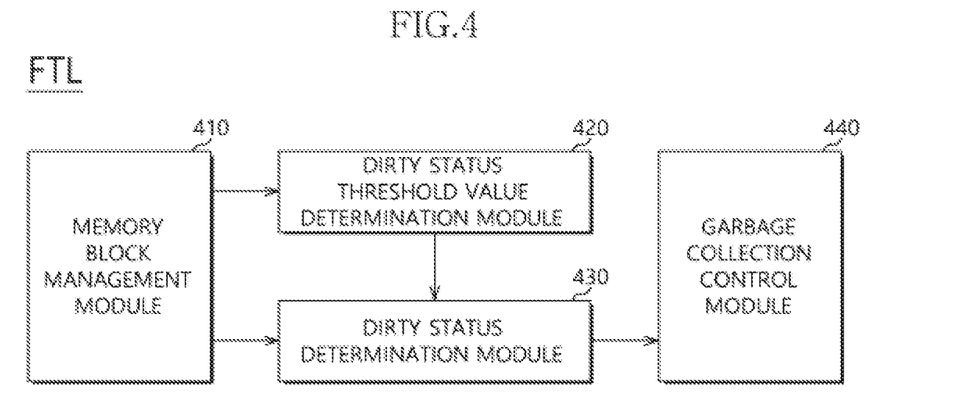
FIG. 4 is a diagram illustrating a configuration of a flash translation layer in accordance with an embodiment of the present disclosure.

FIG. 4 is a diagram illustrating a flash translation layer (FTL) in accordance with an embodiment of the present disclosure.

Referring to FIG. 4, the flash translation layer (FTL) may be included in the processor 220 of FIG. 1. In an embodiment, the flash translation layer (FTL) may control a garbage collection operation on the nonvolatile memory device 100 by determining a dirty status of the nonvolatile memory device 100. When the nonvolatile memory device 100 has the dirty status, the number of free super blocks in the nonvolatile memory device 100 is less than a predetermined number. A free super block is a super block available for being allocated to store data during a write operation.

The flash translation layer (FTL) may include a memory block management module 410, a dirty status threshold value determination module 420, a dirty status determination module 430 and a garbage collection control module 440.

The memory block management module 410 may manage information of memory blocks of the nonvolatile memory device 100 including a plurality of super blocks each comprising a plurality of memory blocks. For example, the memory block management module 410 may manage history information of write, read and erase operations performed to at least one among the memory blocks in the nonvolatile memory device 100. Further, the memory block management module 410 may detect a bad block among the memory blocks configuring the super blocks based on the history information of the memory blocks. Furthermore, the memory block management module 410 may manage, as the normal super block or the low performance super block illustrated in FIGS. 3B to 3D, the super block in which the bad block is replaced with a normal memory block.

In an embodiment, the memory block management module 410 may manage the normal super block and the low performance super block among the plurality of super blocks in the nonvolatile memory device 100 by registering indexes (e.g., addresses) of the normal super block and the low performance super block into a list.

Also, the memory block management module 410 may allocate a memory block, in which write data is to be stored during a write operation. For example, the memory block management module 410 may allocate, as a super block in which write data is to be stored during a write operation, a free super block among the plurality of super blocks in the nonvolatile memory device 100.

In an embodiment, the memory block management module 410 may allocate, as a super block in which write data is to be stored during a write operation, a normal super block more preferentially than a low performance super block among free super blocks. As a normal super block is preferentially allocated as a super block in which write data is to be stored during a write operation, degradation of the memory system 10 may be prevented.

The dirty status threshold value determination module 420 may determine a dirty status threshold value for determining whether the nonvolatile memory system 10 is in a dirty status. The dirty status threshold value determination module 420 may determine the dirty status threshold value based on the number of low performance super blocks. For example, the dirty status threshold value determination module 420 may determine the dirty status threshold value to become greater as the number of the low performance super blocks becomes greater among the free super blocks. Also, the dirty status threshold value determination module 420 may determine the dirty status threshold value to be less as the number of the low performance super blocks becomes less among the free super blocks. As a normal super block is preferentially allocated as a super block in which write data is to be stored during a write operation among the free super blocks, a ratio of the low performance super blocks becomes greater among the free super blocks and thus a garbage collection operation may be degraded in view of operation performance. In accordance with an embodiment of the present disclosure, the nonvolatile memory device 100 may determine by the dirty status, to trigger a garbage collection operation early when the number of the low performance super blocks is great.

In an embodiment, the dirty status threshold value may be determined according to following equation 1. In equation 1, N may represent the dirty status threshold value when the number of the low performance super blocks is 0 and L may represent the number of the low performance super blocks or a value proportional to the number of the low performance super blocks. N and L may be set or variable in fabrication and/or use stages of the memory system 10.

$$\text{Dirty status threshold value } (T) = N + L \qquad \text{[Equation 1]}$$

The dirty status determination module 430 may determine whether the nonvolatile memory device 100 is in a dirty status by comparing the dirty status threshold value with the number of the free super blocks among a plurality of the super blocks in the nonvolatile memory device 100. In detail, the dirty status determination module 430 may determine the nonvolatile memory device 100 not to be in the dirty status when the number of free super blocks is greater than or equal to the dirty status threshold value. Also, the dirty status determination module 430 may determine the nonvolatile memory device 100 to be in the dirty status when the number of free super blocks is less than the dirty status threshold value.

The garbage collection control module 440 may perform a garbage collection operation on the nonvolatile memory device 100 when the nonvolatile memory device 100 is determined to be in the dirty status.

In an embodiment, when the nonvolatile memory device 100 is determined to be in the dirty status, the garbage collection control module 440 may control the nonvolatile memory device 100 such that the garbage collection operation is performed more preferentially than other operations of the memory system 10.

Figure 5:
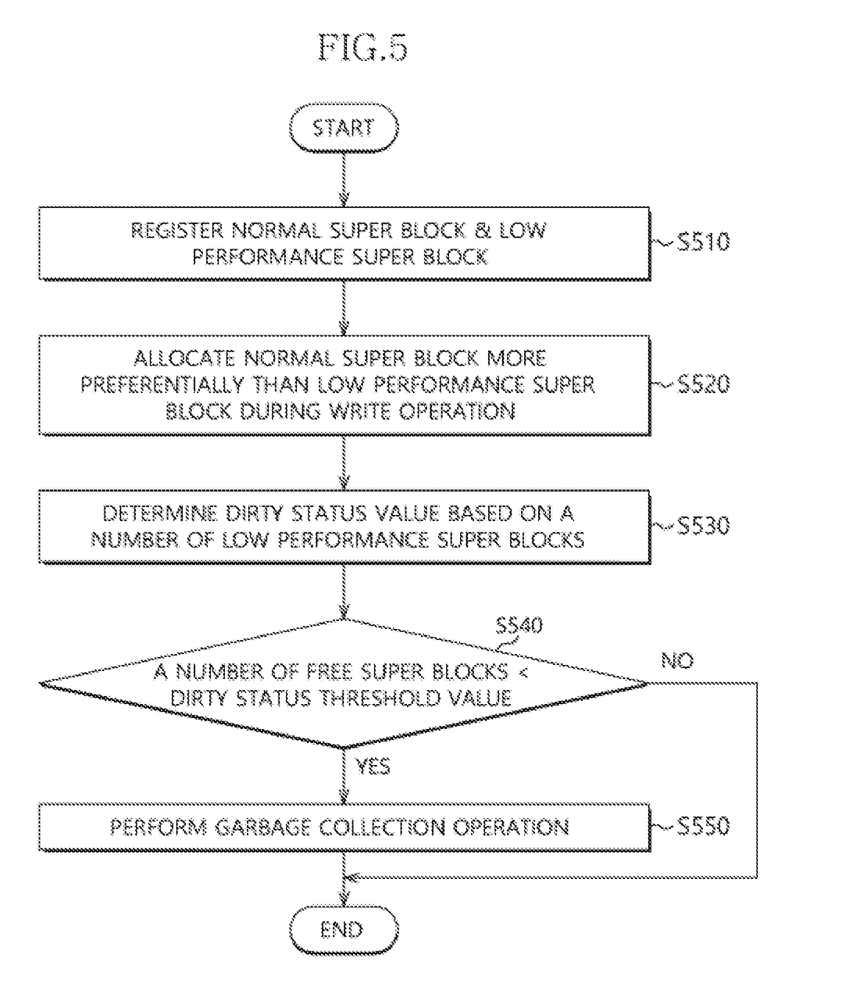
FIG. 5 is a diagram illustrating an operation of a memory system in accordance with an embodiment of the present disclosure.

FIG. 5 is a diagram illustrating an operation of the memory system 10 in accordance with an embodiment of the present disclosure.

Referring to FIG. 5, in step 5510, the memory system 10 may manage a low performance super block among a plurality of super blocks by registering the low performance super block. For example, the controller 200 may determine low performance super blocks among a plurality of super blocks in the nonvolatile memory device 100 and may register super blocks determined as the low performance super blocks into a list.

In step 5520, the memory system 10 may perform a write operation by allocating a normal super block more preferentially than a low performance super block among the free super blocks. For example, the controller 200 may allocate, as a super block into which the write data is to be stored, a normal super block more preferentially than a low performance super block among the free super blocks when a write command and write data are provided from the host 20. The nonvolatile memory device 100 may perform a write operation of storing the write data into the allocated super block.

In step 5530, the memory system 10 may determine the dirty status threshold value based on the number of the low performance super blocks. For example, the controller 200 may determine the dirty status threshold value to be greater as the number of the low performance super blocks becomes greater among the free super blocks. Also, the controller 200 may determine the dirty status threshold value to be less as the number of the low performance super blocks becomes less among the free super blocks.

In step 5540, the memory system 10 may determine whether the nonvolatile memory device 100 is in a dirty status based on the number of the free super blocks. For example, the controller 200 may determine whether the nonvolatile memory device 100 is in a dirty status by comparing the dirty status threshold value with the number of the free super blocks among a plurality of the super blocks in the nonvolatile memory device 100. The controller 200 may determine the nonvolatile memory device 100 not to be in the dirty status when it is determined that the number of free super blocks is greater than or equal to the dirty status threshold value (NO in 5540). Also, the controller 200 may determine the nonvolatile memory device 100 to be in the dirty status when t is determined that the number of free super blocks is less than the dirty status threshold value (YES in 5540).

In step 5550, the memory system 10 may perform a garbage collection operation. For example, the controller 200 may perform a garbage collection operation on the nonvolatile memory device 100 when the nonvolatile memory device 100 is determined to be in the dirty status (YES in 5540).

In an embodiment, the controller 200 may perform the garbage collection operation more preferentially than other operations on the nonvolatile memory device 100.

Figure 6:
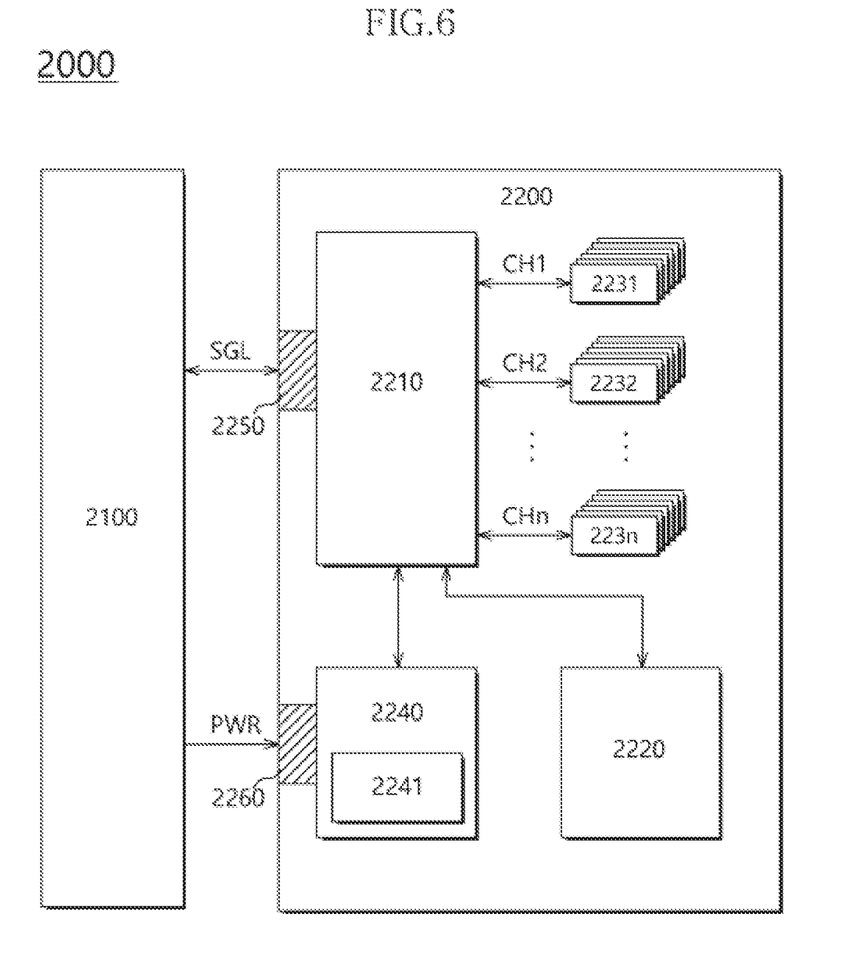
FIG. 6 is a diagram illustrating a data processing system including a solid state drive (SSD) in accordance with an embodiment of the present disclosure.

FIG. 6 is a diagram illustrating a data processing system 2000 including a solid state drive (SSD) in accordance with an embodiment of the present disclosure. Referring to FIG. 6, the data processing system 2000 may include a host 2100 and a solid state drive (SSD) 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2200. The controller 2210 may be implemented and operate in the substantially same way as the controller 200 of FIG. 1.

The buffer memory device 2220 may temporarily store data to be stored in the nonvolatile memory devices 2231 to 223n. Further, the buffer memory device 2220 may temporarily store data read out from the nonvolatile memory devices 2231 to 223n. The data temporarily stored in the buffer memory device 2220 may be transmitted to the host 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be electrically coupled to the controller 2210 through a plurality of channels CH1 to CHn, respectively. One or more nonvolatile memory devices may be coupled to a single channel. The nonvolatile memory devices coupled to the single channel may be coupled to the same signal bus and data bus.

The power supply 2240 may provide the inside of the SSD 2200 with power PWR inputted through the power connector 2260. The power supply 2240 may include an auxiliary power supply 2241. The auxiliary power supply 2241 may supply power to allow the SSD 2200 to be normally terminated when sudden power-off (SPO) occurs. The auxiliary power supply 2241 may include large capacity capacitors capable of charging the power PWR.

The controller 2210 may exchange a signal SGL with the host 2100 through the signal connector 2250. The signal SGL may include a command, an address, and data. The signal connector 2250 may be configured of various types of connectors according to an interface scheme between the host 2100 and the SSD 2200.

Figure 7:
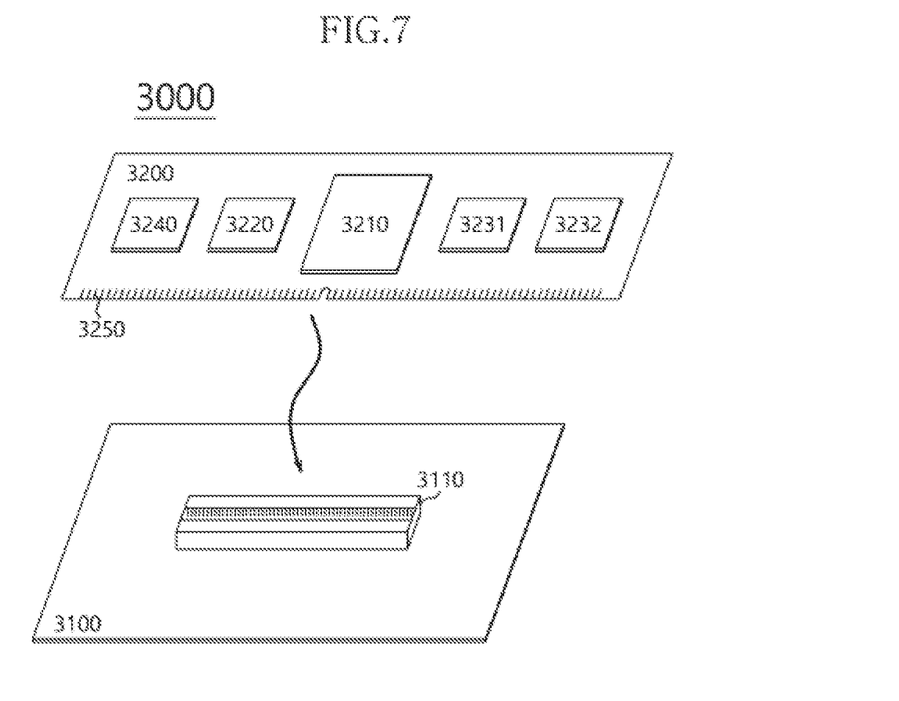
FIG. 7 is a diagram illustrating a data processing system including a memory system in accordance with an embodiment of the present disclosure.

FIG. 7 is a diagram illustrating a data processing system 3000 including a memory system in accordance with an embodiment of the present disclosure. Referring to FIG. 7, the data processing system 3000 may include a host 3100 and a memory system 3200.

The host 3100 may be configured in the form of a board such as a printed circuit board. Although not shown in FIG. 7, the host 3100 may include internal function blocks for performing functions of a host.

The host 3100 may include a connection terminal 3110 such as a socket, a slot or a connector. The memory system 3200 may be mounted on the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control an overall operation of the memory system 3200. The controller 3210 may be configured in the substantially same manner as the controller 2210 shown in FIG. 6.

The buffer memory device 3220 may temporarily store data to be stored in the nonvolatile memory devices 3231 and 3232. Further, the buffer memory device 3220 may temporarily store data read out from the nonvolatile memory devices 3231 and 3232. The data temporarily stored in the buffer memory device 3220 may be transmitted to the host 3100 or the nonvolatile memory devices 3231 and 3232 according to control of the controller 3210.

The nonvolatile memory devices 3231 and 3232 may be used as storage media of the memory system 3200.

The PMIC 3240 may provide the inside of the memory system 3200 with power inputted through the connection terminal 3250. The PMIC 3240 may manage the power of the memory system 3200 according to control of the controller 3210.

The connection terminal 3250 may be electrically coupled to the connection terminal 3110 of the host 3100. Through the connection terminal 3250, signals such as commands, addresses, and data, and power may be transferred between the host 3100 and the memory system 3200. The connection terminal 3250 may be configured as various types depending on an interface scheme between the host 3100 and the memory system 3200. The connection terminal 3250 may be disposed on any one side of the memory system 3200.

Figure 8:
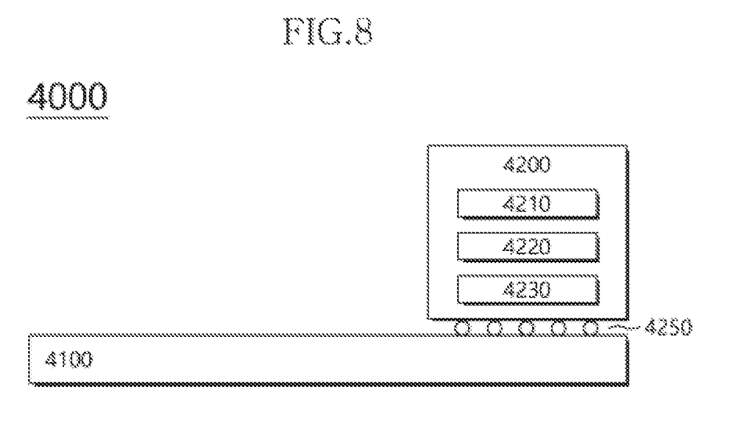
FIG. 8 is a diagram illustrating a data processing system including a memory system in accordance with an embodiment of the present disclosure.

FIG. 8 is a diagram illustrating a data processing system 4000 including a memory system in accordance with an embodiment of the present disclosure. Referring to FIG. 8, the data processing system 4000 may include a host 4100 and a memory system 4200.

The host 4100 may be configured in the form of a board such as a printed circuit board. Although not shown in FIG. 8, the host 4100 may include internal function blocks for performing functions of a host.

The memory system 4200 may be configured in the form of a package of a surface-mounting type. The memory system 4200 may be mounted on the host 4100 through solder balls 4250. The memory system 4200 may include a controller 4210, a buffer memory device 4220, and a nonvolatile memory device 4230.

The controller 4210 may control an overall operation of the memory system 4200. The controller 4210 may be configured in the substantially same manner as the controller 2210 shown in FIG. 6.

The buffer memory device 4220 may temporarily store data to be stored in the nonvolatile memory device 4230. Further, the buffer memory device 4220 may temporarily store data read out from the nonvolatile memory device 4230. The data temporarily stored in the buffer memory device 4220 may be transmitted to the host 4100 or the nonvolatile memory device 4230 according to control of the controller 4210.

The nonvolatile memory device 4230 may be used as a storage medium of the memory system 4200.

Figure 9:
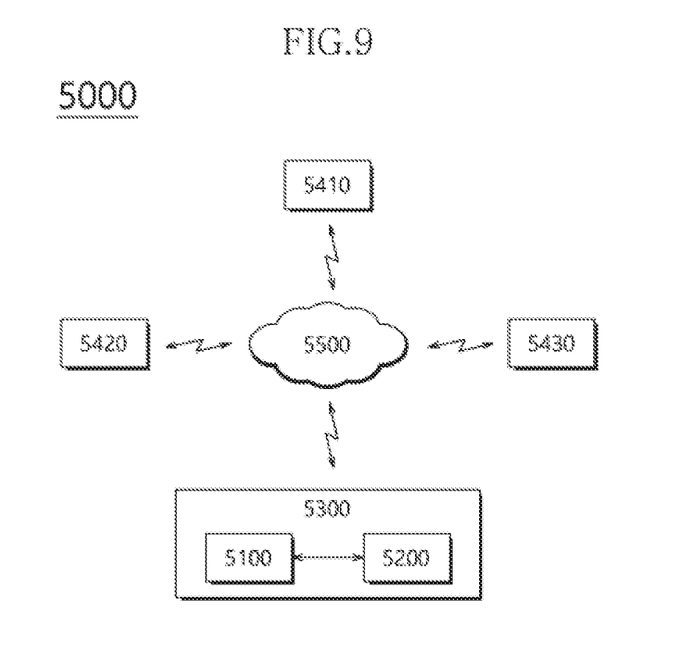
FIG. 9 is a diagram illustrating a network system including a memory system in accordance with an embodiment of the present disclosure.

FIG. 9 is a diagram illustrating a network system 5000 including a memory system in accordance with an embodiment of the present disclosure. Referring to FIG. 9, the network system 5000 may include a server system 5300 and a plurality of client systems 5410 to 5430 which are electrically coupled to each other through a network 5500.

The server system 5300 may service data in response to requests from the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host 5100 and a memory system 5200. The memory system 5200 may be configured of the memory system 10 illustrated in FIG. 1, the SSD 2200 illustrated in FIG. 6, the memory system 3200 illustrated in FIG. 7, or the memory system 4200 illustrated in FIG. 8.

While certain embodiments have been described above, it will be understood to those skilled in the art that the embodiments described are by way of example only. Accordingly, the controller, memory system and operating method thereof should not be limited based on the described embodiments. Rather, the controller, memory system and operating method thereof described herein should only be limited in light of the claims that follow when taken in conjunction with the above description and accompanying drawings.

What is claimed is:

1. A memory system comprising:
   a nonvolatile memory device including a plurality of super blocks each comprising a plurality of memory blocks; and
   a controller configured to control the nonvolatile memory device,
   wherein the controller is configured to:
   determine, based on a number of low performance super blocks among the plurality of super blocks, a dirty status threshold value for determining a dirty status of the nonvolatile memory device;
   determine whether the nonvolatile memory device is in the dirty status based on a number of free super blocks among the plurality of super blocks and the dirty status threshold value; and
   perform a garbage collection operation on the plurality of super blocks when it is determined that the nonvolatile memory device is in the dirty status.

2. The memory system of claim 1, wherein the controller is configured to determine the dirty status threshold value to increase as the number of low performance super blocks becomes greater.

3. The memory system of claim 1, wherein the controller is configured to determine the dirty status threshold value to decrease as the number of low performance super blocks becomes less.

4. The memory system of claim 1, wherein the low performance super blocks include a super block including at least one memory block, on which an interleaving operation cannot be performed.

5. The memory system of claim 1, wherein the low performance super blocks include a super block including a smaller number of memory blocks than a normal super block among the plurality of super blocks.

6. The memory system of claim , wherein the low performance super blocks include a super block having a smaller capacity than a normal super block among the plurality of super blocks.

7. The memory system of claim 1, wherein the controller is configured to preferentially perform the garbage collection operation than other operations on the nonvolatile memory device.

8. The memory system of claim 1, wherein the controller is configured to determine the nonvolatile memory device to be in the dirty status when the number of free super blocks is less than the dirty status threshold value.

9. The memory system of claim 1, wherein the controller is configured to determine the nonvolatile memory device not to be in the dirty status when the number of free super blocks is greater than or equal to the dirty status threshold value.

10. An operating method for a memory system comprising a nonvolatile memory device including a plurality of super blocks each comprising a plurality of memory blocks and a controller configured to control the nonvolatile memory device, the operating method comprising:
   determining, by the controller, based on a number of low performance super blocks among the plurality of super blocks, a dirty status threshold value for determining a dirty status of the nonvolatile memory device;
   determining, by the controller, whether the nonvolatile memory device is in the dirty status based on a number of free super blocks among the plurality of super blocks and the dirty status threshold value; and
   performing, by the controller, a garbage collection operation on the plurality of super blocks when it is determined that the nonvolatile memory device is in the dirty status.

11. The operating method of claim 10, wherein the determining of the dirty status threshold value includes determining the dirty status threshold value to increase as the number of low performance super blocks becomes greater.

12. The operating method of claim 10, wherein the determining of the dirty status threshold value includes determining the dirty status threshold value to decrease as the number of low performance super blocks becomes less.

13. The operating method of claim 10, wherein the low performance super blocks include a super block including at least one memory block, on which an interleaving operation cannot be performed.

14. The operating method of claim 10, wherein the low performance super blocks include a super block including a smaller number of memory blocks than a normal super block among the plurality of super blocks.

15. The operating method of claim 10, wherein the low performance super blocks include a super block having a smaller capacity than a normal super block among the plurality of super blocks.

16. The operating method of claim 10, wherein the performing of the garbage collection operation includes preferentially performing the garbage collection operation than other operations on the nonvolatile memory device.

17. The operating method of claim 10, wherein the determining of whether the nonvolatile memory device is in the dirty status includes determining the nonvolatile memory device to be in the dirty status when the number of free super blocks is less than the dirty status threshold value.

18. The operating method of claim 10, wherein the determining of whether the nonvolatile memory device is in the dirty status includes determining the nonvolatile memory device not to be in the dirty status when the number of free super blocks is equal to or greater than the dirty status threshold value.

19. A memory system comprising:
a nonvolatile memory device including a plurality of free super blocks including low performance super blocks and normal blocks; and
a controller coupled to the nonvolatile memory device, suitable for:
determining whether a number of free super blocks is less than a threshold value;
when it is determined that the number of free super blocks is less than a threshold value, determining the nonvolatile memory device is in a dirty status; and
performing a garbage collection operation on the plurality of super blocks when it is determined that the nonvolatile memory device is in the dirty status,
wherein the threshold value is adjusted based on the number of low performance super blocks.

* * * * *

UNITED STATES PATENT AND TRADEMARK OFFICE
CERTIFICATE OF CORRECTION

PATENT NO. : 10,929,289 B2
APPLICATION NO. : 16/598776
DATED : February 23, 2021
INVENTOR(S) : Hyeong Ju Na et al.

Page 1 of 1

It is certified that error appears in the above-identified patent and that said Letters Patent is hereby corrected as shown below:

In the Claims

In Column 12, Line 13, after "claim", --1-- should be inserted.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*